Figure 1:
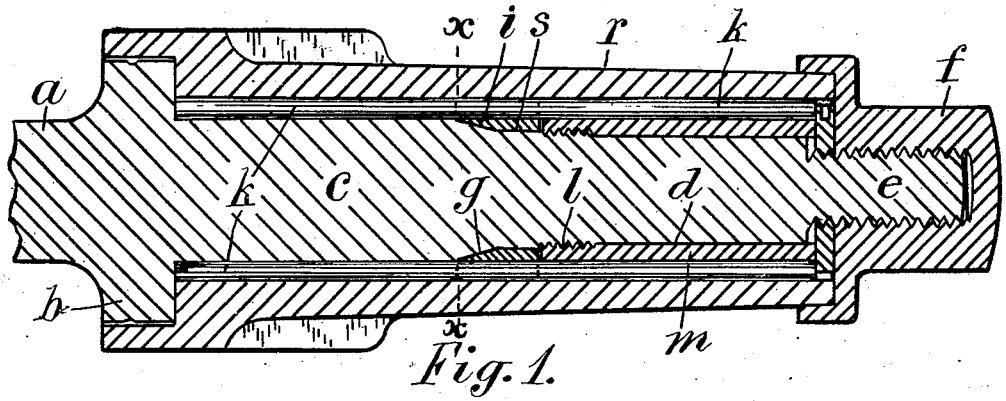

L. J. ALDRIDGE.
ROLLER BEARING.
APPLICATION FILED JAN. 5, 1909.

933,735.

Patented Sept. 14, 1909.

Witnesses:
L. Lee.
J. W. Greenbaum

Inventor.
Lincoln J. Aldridge,
per Thomas S. Crane, Atty.

UNITED STATES PATENT OFFICE.

LINCOLN J. ALDRIDGE, OF PLATTSBURG, NEW YORK, ASSIGNOR TO ALDRIDGE ROLLER BEARING MANUFACTURING COMPANY, A CORPORATION OF NEW YORK.

ROLLER-BEARING.

933,735.  Specification of Letters Patent.  Patented Sept. 14, 1909.

Application filed January 5, 1909. Serial No. 470,797.

*To all whom it may concern:*

Be it known that I, LINCOLN J. ALDRIDGE, a citizen of the United States, residing at 40 Lorrain street, Plattsburg, county of Clinton, State of New York, have invented certain new and useful Improvements in Roller-Bearings, fully described and represented in the following specification and the accompanying drawings, forming a part of the same.

The present invention relates to that class of roller bearings in which an annular rotatable retainer having cylindrical grooves to receive anti-friction rolls is fitted to the middle of the journal to hold the rolls thereon while applying the casing or axle-box thereto, the rolls being extended the whole length of the journal. Such a retainer has been held in place upon the middle of the journal by forming the journal for more than half its length with a reduced portion to which the retainer is movably fitted, and restoring the diameter of such reduced portion by a sleeve extended from the end of the journal to such retainer.

The present invention consists in forming a cylindrical seat intermediate to the two portions of the journal, and connecting such seat with the larger portion by a tapering neck and with the smaller portion by a screw-thread which, like the seat, projects above the surface of such reduced portion. With this construction, the bore of the retainer is flared at one end to fit the tapering neck and is made cylindrical at the other end to fit the cylindrical seat. The tapering neck makes the shoulder much stronger than the abrupt shoulder which has been heretofore used. The sleeve is fitted to the screw-thread, and can thus be held positively from end movement when suitably adjusted to hold the retainer movably. The casing of the roller bearing is secured in place by an axle-nut upon the end of the axle, but a lock-washer is fitted to such thread between the nut and the end of the sleeve to lock the sleeve in place independently of such nut. The thread upon the seat and the thread upon the end of the axle are opposed to one another.

The invention is shown in the drawing applied to an axle-box for a vehicle wheel, but these improvements may be used in any roller bearing to which they are applicable.

Figure 2:
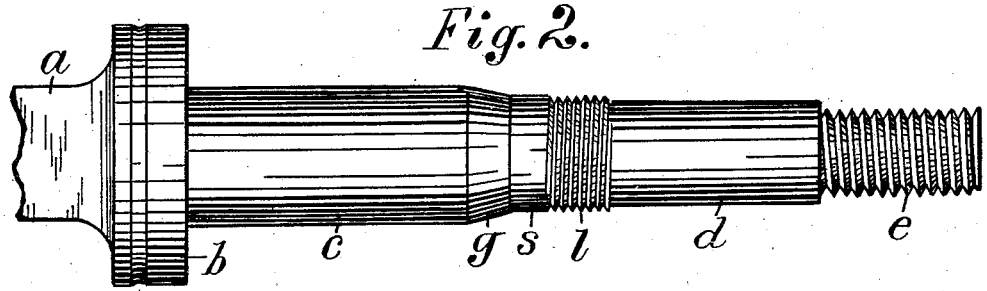
Figure 3:
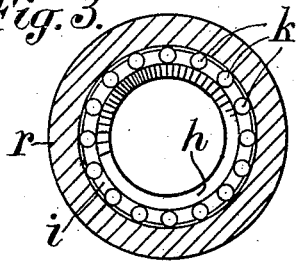
Figure 4:
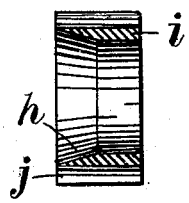
Figures 5, 6:
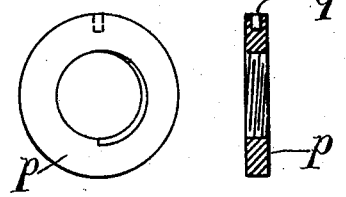
Figure 8:
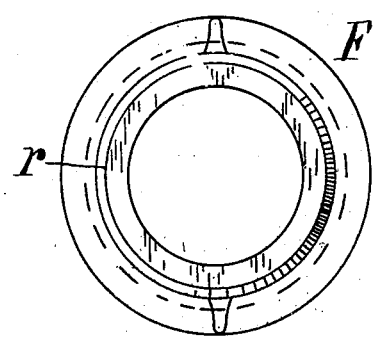
Figure 7:
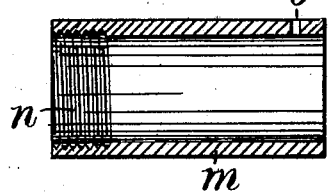

In the drawing, Figure 1 is a longitudinal section, where hatched, of an axle-box with the axle therein; Fig. 2 is a side elevation of the axle; Fig. 3 is a cross section on line $x$—$x$ in Fig. 1 with the axle omitted; Fig. 4 is a longitudinal section of the annular retainer; Fig. 5 is an end view, and Fig. 6 a central cross section of the lock-washer for the sleeve; Fig. 7 is a longitudinal section of the sleeve, and Fig. 8 an end view of the axle-box to which a wooded hub could be applied.

The axle $a$ is shown with the usual collar $b$ from which the journal of the axle directly projects and is formed with a larger portion $c$ and reduced portion $d$, the end of which reduced portion is provided with a screw-thread $e$ to receive the axle-nut $f$ which holds the casing $r$ upon the journal.

A cylindrical seat $s$ is formed intermediate the portions $c$ and $d$ and connected with the larger portion by a tapering neck $g$, and with the reduced portion by a thread $l$ which, like the cylindrical seat $s$, projects above the surface of such reduced portion which necessitates increasing the bore of the annular retainer.

A sleeve $m$ of the same size as the portion $c$ is fitted to the reduced portion $d$ and provided with a thread $n$ to screw upon the thread $l$.

A series of numerous anti-friction rolls $k$ is fitted between the journal and the casing $r$, and the rolls are secured movably upon the journal by the annular retainer $i$ which is fitted to the seat $s$ and neck $g$ and formed with cylindrical notches $j$ to hold the anti-friction rolls movably.

The bore of the retainer is flared at one end $h$ to fit the tapering neck $g$, and is cylindrical at the other end to fit the seat $s$. The tapering neck makes the journal much stronger than the abrupt shoulder heretofore used. The periphery of the retainer is made as usual, a little smaller than the bore of the axle-box so that the notches $j$ in which the rolls $k$ are placed are open upon the outer side, but the cylindrical form of the notches operates to retain the rolls upon the axle when the casing is removed, or before it is applied, thus rendering the assemblage of the parts exceedingly simple and expeditious, while the retainer permits the rolls to rotate in the notches in their movement about the axle when the bearing is in operation.

The thread $l$ permits the sleeve to be adjusted longitudinally to hold the retainer movably upon the seat and to prevent the axle-nut from accidentally crowding it against the retainer.

A lock-washer $p$ is formed to screw upon the thread $e$ outside the end of the journal, to jam against the end of the sleeve and lock it in place when adjusted.

Holes $o$ and $q$ are formed, respectively, in the sleeve and washer to turn them by a suitable spanner.

The thread $l$ is inclined in the opposite direction to the thread $e$, as shown in Fig. 2, so that when the lock-washer is screwed up it will not rotate the sleeve or derange its adjustment. The axle-nut may be turned directly against the lock-washer without deranging the adjustment of the lock-washer and sleeve. The lock-washer thus performs the double function of holding the sleeve in its adjusted position, and of preventing the axle-nut $f$ from crowding the sleeve inwardly or from rotating the sleeve when the axle-nut is screwed upon the axle.

It will be seen in Fig. 1 that the periphery of the lock-washer projects above the periphery of the sleeve across the ends of the rolls $k$ and thus operates also to hold the rolls upon the journal, when the nut $f$ is unscrewed and the wheel containing the axle-box $r$ is removed to inspect or lubricate the journal.

These improvements are of great practical value in the use of the axle, as they strengthen the axle where the retainer is applied to it, they permit an exact adjustment of the sleeve longitudinally, and they provide for retaining such adjustment during the use of the roller bearing.

The projection of the thread $l$ and seat $s$ above the reduced portion of the axle necessitates enlarging the bore of the retainer to pass over such thread when applying it to the seat $s$, but the retainer is not subjected to any strain, and the bore can be enlarged without weakening it injuriously.

The thread $l$ can be made finer than that shown in the drawing, to avoid any needless projection of the thread and seat above the reduced portion.

The use of the tapering neck to strengthen the junction of the larger and smaller portions of the journal is not dependent upon the use of the thread $l$, and I have, therefore, claimed such a tapering junction of the larger and smaller portions, irrespective of the intermediate portion upon which the thread $l$ is formed.

Having thus set forth the nature of the invention, what is claimed herein is:

1. In a roller bearing, the combination, with an axle having the larger portion $c$ and reduced portion $d$ with tapering junction or neck $g$, and a casing and rolls fitted to the axle, of an annular roll-retainer having flaring bore fitted movably to the tapering neck and a sleeve fitted to the reduced portion $d$ of the axle to hold such roll-retainer in place.

2. In a roller bearing, the combination, with an axle having the larger portion $c$ and reduced portion $d$ with tapering junction or neck $g$, of the annular roll-retainer having flaring bore fitted movably upon the tapering neck, the axle having a screw-thread $l$ adjacent to the retainer, and the sleeve $m$ having internal thread $n$ fitted to the thread $l$ for adjusting the end of the sleeve to and from the edge of the retainer.

3. In a roller bearing, the combination, with an axle having the larger portion $c$ and reduced portion $d$ with tapering junction or neck $g$, and a casing and rolls fitted about the axle, of the annular roll-retainer having flaring bore fitted movably upon the tapering neck, the axle having the screw-thread $l$ adjacent to the retainer and screw-thread $e$ upon the end, such threads being reversely inclined as set forth, a sleeve $m$ having internal thread $n$ fitted to the thread $l$, and the lock-washer $p$ screwed upon the thread $e$ to hold the sleeve in its adjusted position.

4. In a roller bearing, the combination, with an axle having the larger portion $c$ and reduced portion $d$ as set forth, with a casing and rolls fitted to the axle, and an annular roll-retainer fitted movably to the axle at the junction of the larger and reduced portions, of a sleeve fitted to the reduced portion and provided with means for adjusting it longitudinally upon such reduced portion and securing it rigidly in place when adjusted, independently of the axle-nut.

5. In a roller bearing, the combination, with an axle having the larger portion $c$ and reduced portion $d$ with tapering junction or neck $g$, and a casing and rolls fitted about the axle, of the annular roll-retainer having flaring bore fitted movably upon the tapering neck, the axle having the screw-thread $l$ adjacent to the retainer and screw-thread $e$ upon the end, the sleeve $m$ having internal thread $n$ fitted to the thread $l$ for adjusting the sleeve upon the axle, the lock-washer $p$ secured upon the end of the axle to hold the sleeve in its adjusted position, and the axle-nut $f$ screwed upon the end of the axle outside of the lock-washer, for securing the casing in place.

6. In a roller bearing, the combination, with an axle having the larger portion $c$, the reduced portion $d$ and intermediate portion formed with retainer-seat $s$ and screw-thread $l$, and a tapering neck $g$ connecting such seat with the larger portion $c$, of the annular roll-retainer $i$ having cylindrical bore fitted to the seat $s$ and flaring bore $h$ fitted to the tapering neck $g$, and the sleeve $m$ having internal thread $n$ fitted to the thread $l$ for adjusting the end of the sleeve to and from the edge of the retainer.

In testimony whereof I have hereunto set my hand in the presence of two subscribing witnesses.

LINCOLN J. ALDRIDGE.

Witnesses:
EGBERT C. EVEREST,
WILLIAM N. McINTYRE.